(12) United States Patent
Beczkowski et al.

(10) Patent No.: US 7,445,245 B2
(45) Date of Patent: Nov. 4, 2008

(54) ANATOMICAL CONFIGURATION OF SAFETY BELTS IN CARS AND ACCESSORIES FOR ITS IMPLEMENTATION

(76) Inventors: Andrzej Beczkowski, Aleja Majowa 11/12, 44-100 Gliwice (PL); Krzysztof Postawa, ul. Czestochowska 13/9, 44-100 Gliwice (PL)

( * ) Notice: Subject to any disclaimer, the term of this patent is extended or adjusted under 35 U.S.C. 154(b) by 432 days.

(21) Appl. No.: 11/251,729

(22) Filed: Oct. 17, 2005

(65) Prior Publication Data

US 2006/0125227 A1    Jun. 15, 2006

(30) Foreign Application Priority Data

Dec. 13, 2004    (PL) .................................. 371705

(51) Int. Cl.
*B60R 22/00* (2006.01)

(52) U.S. Cl. ............ 280/808; 280/801.1; 297/482

(58) Field of Classification Search ............ 280/801.1, 280/808; 297/482, 488, 483
See application file for complete search history.

(56) References Cited

U.S. PATENT DOCUMENTS

| | | | |
|---|---|---|---|
| 5,605,380 A * | 2/1997 | Gerstenberger et al. | 297/483 |
| 5,664,843 A * | 9/1997 | Gleason | 297/471 |
| 6,322,149 B1 * | 11/2001 | Conforti et al. | 297/482 |
| 6,382,730 B1 * | 5/2002 | Closner | 297/482 |

FOREIGN PATENT DOCUMENTS

| | | | |
|---|---|---|---|
| DE | 3132735 A1 * | 3/1983 | |
| DE | 3830925 A1 * | 3/1990 | |
| DE | 10112180 A1 * | 9/2002 | |
| EP | WO 00/41920 | 7/2000 | |
| GB | 2048651 A * | 12/1980 | |
| WO | WO 2005085017 A1 * | 9/2005 | |

* cited by examiner

*Primary Examiner*—Eric Culbreth
*Assistant Examiner*—Nicole Verley
(74) *Attorney, Agent, or Firm*—Kratz, Quintos & Hanson, LLP

(57) ABSTRACT

A way of shaping anatomically the safety belts of cars, particularly for the use of women. The essence of this anatomical shaping of a safety belt consists in providing such a form of the belt that it looks like an elongated S, passing between the breasts as well as above and under the bust. The safety belt is provided with a shaping strip, which is a flat sleeve made of elastic plastic material in the form of an elongated S, with a rigid material lining, which can be opened and closed on the side by means of any kind of fastener, for example a zipper or Velcro. On the upper part of the strip there is a pad protecting the collar-bone and neck against pressure and rubbing. The strip is put on the safety belt, so that it takes the required shape without affecting the structure of the safety belt. The strip can be shifted along the safety belt, adapting it to the height of the passenger. It is practically stable on the safety belt because of its shape, but it can be additionally stabilized by means of a tension pull, the length of which can be adjusted according to the needs of the wearer. The pull can be provided with a clasp, attached to the outer bottom part of the edge of the abdomen part of the safety belt.

10 Claims, 3 Drawing Sheets

ANATOMICAL CONFIGURATION OF SAFETY BELTS IN CARS AND ACCESSORIES FOR ITS IMPLEMENTATION

This application claims priority of Poland Application No. P371705, filed Dec. 13, 2004.

FIELD OF THE INVENTION

The subject matter of this invention is a safety belt in a vehicle and the shape of the safety belt in relation to the anatomy of a person, being restrained, especially a woman.

BACKGROUND OF THE INVENTION

Generally, safety belts in cars are positioned at the chest and the abdomen of the passenger. The chest portion of the safety belt extends diagonally across the breast of a sensitive person especially a woman and exerts a constant pressure due to the tightening mechanism. In the case of a women this pressure can irritate the epidermis and lead to considerable discomfort. The collar-bone can also be irritated because the configuration of the safety belt is not always appropriate for a given passenger. If the driver is using the safety belt, the driver, from time to time, arranges the safety belt thus taking his/her hands off the steering wheel, which may prove to be dangerous.

In order to minimize all of the above-described problems, pads may be used, made of a soft material wrapped around the belt and fastened alongside by means of a zipper or Velcro. The pad is usually located on the diagonal part of the belt which restrains the chest of the wearer. Such pads help to distribute the pressure, however the constant pressure during a long trip can still cause irritation or possibly blisters. Also, in the case of sudden braking or a collision the milch gland of a woman can be injured, and may require a medical operation.

SUMMARY OF THE INVENTION

The present invention is an anatomically shaped safety belt sleeve having the shape of the letter "S", so that it passes between the breasts of a woman. The sleeve can be made of an elastic plastic material, for example polyurethane foam. Inside the sleeve a rigid material, such as whalebone, is placed to maintain the shape of an elongated "S". The side of the belt facing the wearer can be reinforced to reduce twisting of the belt so as to minimize the pressure of lateral forces in case of sudden braking or a collision.

The sleeve can be shifted along the belt to adjust it to the needs of the wearer. Also, it can be fastened by means of a clip to the abdomen portion of the belt.

In another embodiment of the safety belt, a guide and slide can be provided on the sleeve in order to fasten it to the abdomen portion of the belt. With a guide and a slide the sleeve can be adjusted to the requirements of the wearer.

BRIEF DESCRIPTION OF THE DRAWINGS

The invention will become more readily apparent from the following description of a preferred embodiment thereof shown, by way of example only, in the accompanying drawings, wherein.

DETAILED DESCRIPTION OF THE INVENTION

Figure 1:
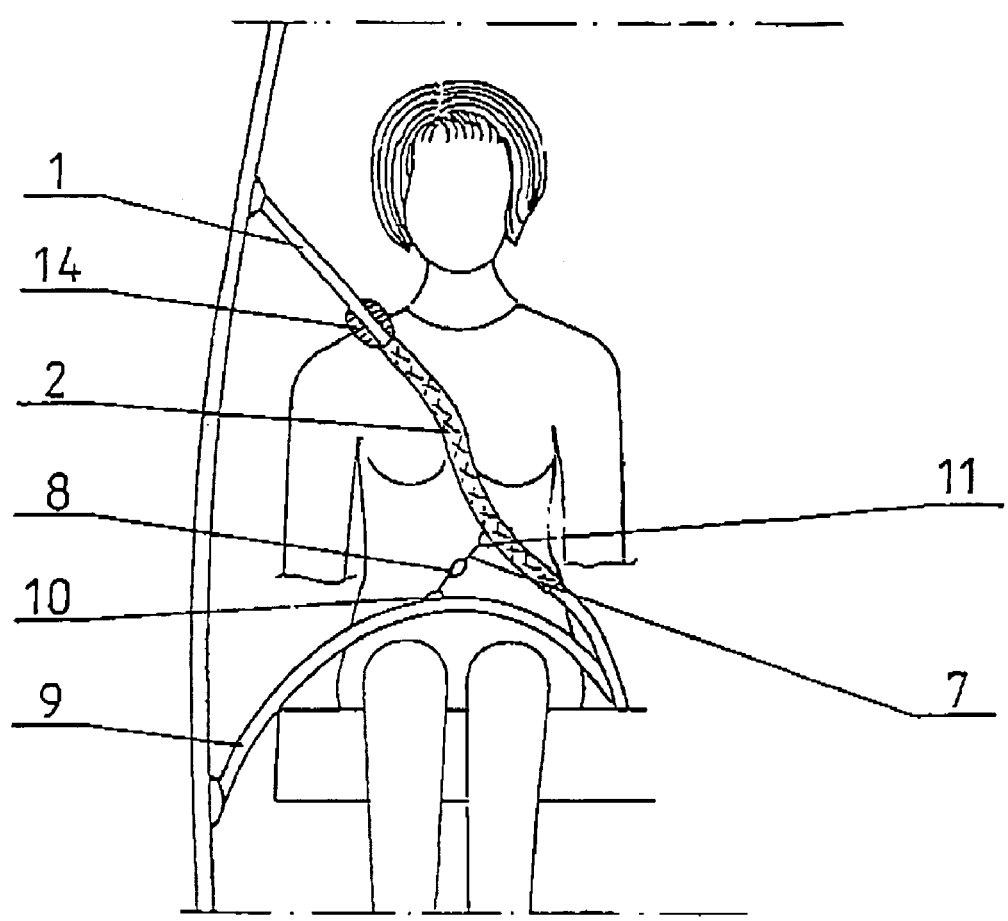
FIG. 1 is a front view of a woman being restrained by a safety belt having a device of the invention.
Figure 2:
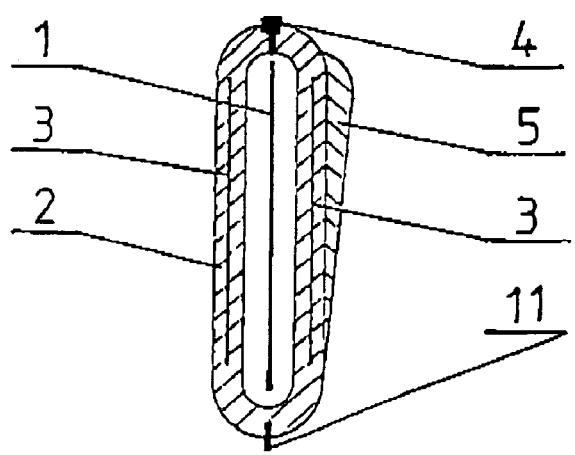
FIG. 2 is a transverse cross-section of the safety belt and the device of the invention.

The anatomical shaping of the safety belt with use of a sleeve is shown in FIG. 1, wherein a woman is restrained by a safety belt having a sleeve. FIG. 2 presents a transverse cross-section of the safety belt and sleeve of the invention.

The device of the invention is formed of a shaped strip 2 forming a sleeve to encompass the safety belt. Inside the strip is a rigid material 3, to maintain the "S" shape of the sleeve. The rigid material can be whalebone. The strip can be made of an elastic plastic material such as polyurethane foam. One long side of the sleeve, which is elongated, is provided with a fastener, such as a zipper or Velcro. The long side of the sleeve is indicated at 4 whereat the rectangular area represents a zipper or a Velcro fastener.

The sleeve is placed on the safety belt 1, so as to adapt the shape of the belt, without damaging the belt. On an upper inside edge of the strip 2, adjacent to a breast of a woman wearer, additional padding 5, as shown in FIG. 2 can be provided in order to better distribute pressure acting on both sides of the bust in case of sudden braking or a collision. At an upper end of the strip 2, additional pads 14 can be attached in order to neutralize the constant pressure exerted on the collar-bone or neck.

The sleeve can be shifted along the safety belt 1, depending on the height of the wearer, its position remaining practically stable due to its curvature. However, it can be made more stable by means of a tensioning pull 7 making use of clamp 8 fastened to an external lower edge of the strip and then to the abdomen portion 9 of the safety belt with use of clip 10.

Figure 3:
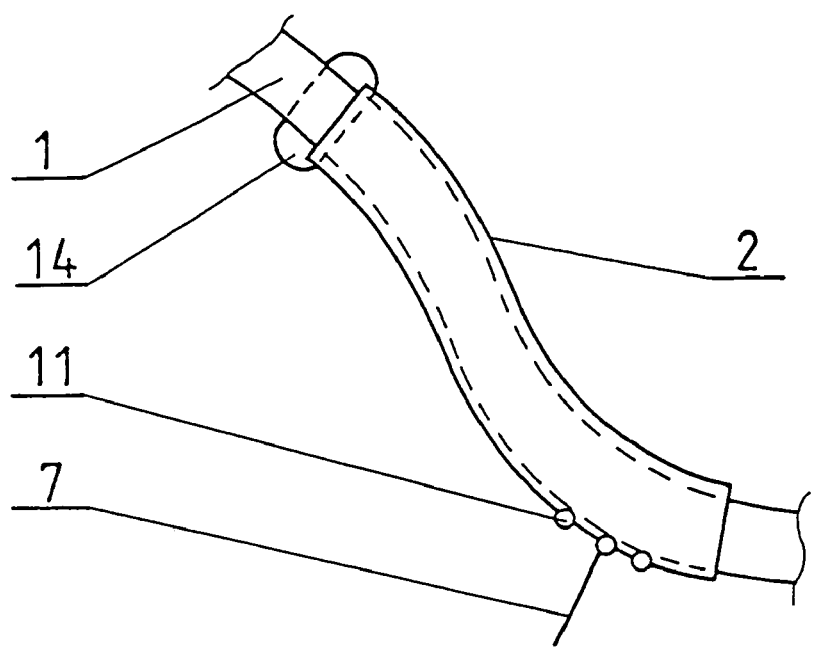
FIGS. 3 and 4 are views of the device of the invention for showing various features of the device of the invention for connecting it to an abdomen portion of a seat belt.

As the proportions of human bodies differ from person to person, there are also possible several hitches 11 for use in fastening to the abdomen portion 9 of the safety belt, and it is best to adapt the pull 7 in such a way that it would run perpendicular to a tangential line for the lower edge of the strip 2, as shown in FIG. 3.

Figure 6:
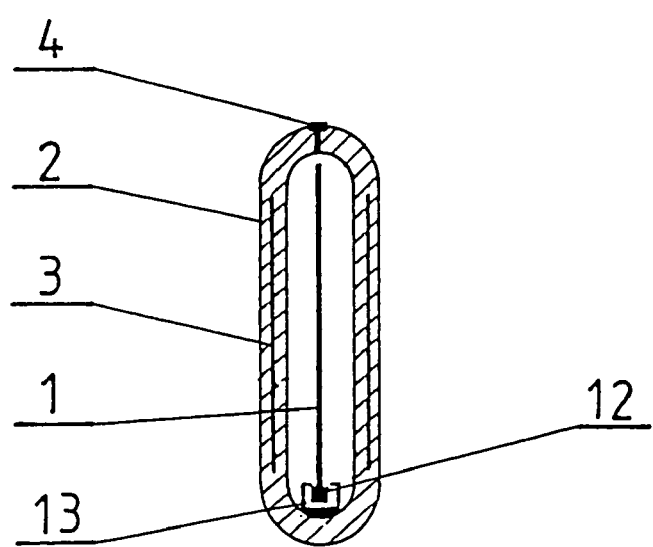
FIG. 6 is a transverse cross-section of a safety belt and another embodiment of the device of the invention.

In another embodiment of the strip of the sleeve, shown in FIG. 6, on an outer edge, just under an edge under a bust of a wearer there is a segmental guide 12 with at least one slide 13 and a pull 7 for fastening to the abdomen portion of the safety belt. The segmental guide 12 consists of several profiled segments, for example beads clamped on the safety belt 1, along its edge, forming a kind of zip fastener. The slide 13 has a channel of the shape of the guide 12, and the guide has on its edges blocking segments.

Figure 5:
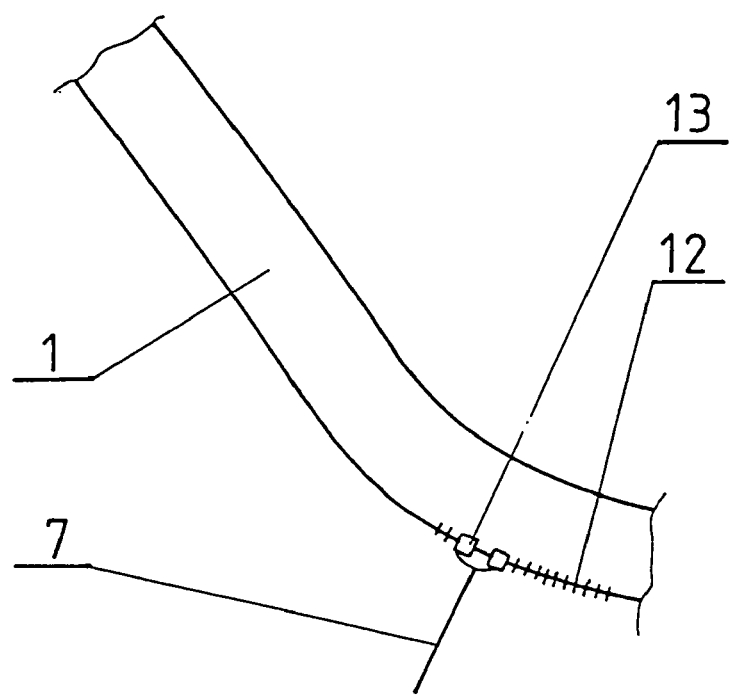
FIG. 5 is a view of a safety belt having a connecting feature attached directly to the safety belt.

In another embodiment, on an outer edge of the safety belt, just under the bust of the wearer, there is provided a guide 12 with at least one slide 13 provided with a pull 7, which is fastened to the abdomen portion of the safety belt. With such an arrangement the direction of the safety belt can be arranged under the bust of the wearer, as shown in FIG. 5, without the necessity of using the sleeve.

Figure 4:
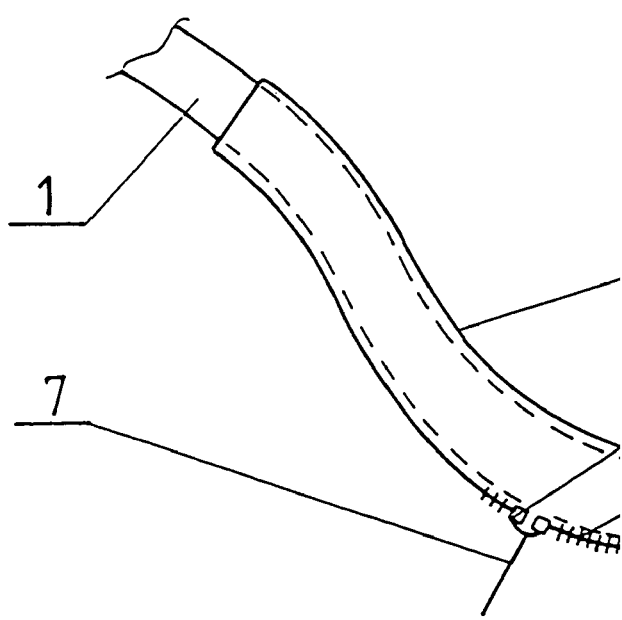

In still another embodiment, the safety belt has on an outer edge, under the bust of a wearer, a guide 12, and on the inside bottom edge there are slides 13, by means of which the sleeve 2 can be adjusted on the safety belt 1, and fastened by means of the clip 10 as shown in FIG. 4.

While specific materials, dimensional data, etc. have been set forth for purposes of describing embodiments of the invention, various modifications can be resorted to, in light of the above teachings, without departing from Applicant's novel contributions; therefore in determining the scope of the present invention, reference shall be made to the appended claims.

The invention claimed is:

1. A sleeve for use with an automobile safety belt for restraining a wearer, said safety belt having a chest portion and an abdomen portion, comprising an elongated flat strip for encompassing at least part of the chest portion of an automobile safety belt, wherein said sleeve causes said encompassed portion to be S-shaped along its length, so as to pass between the breasts then under a breast of a wearer being restrained by said safety belt.

2. The sleeve of claim 1, wherein said strip includes padding for cushioning of the chest of the wearer being restrained, from the restraining pressure of the safety belt.

3. The sleeve of claim 2, wherein said padding is in the form of a polyurethane sponge material.

4. The sleeve of claim 2, wherein a pad is attached to an end portion of the strip, for locating at an upper end of the chest portion of the safety belt, to protect the collar-bone and neck of the wearer being restrained.

5. The sleeve of claim 1 wherein said strip is readily openable along one of its long edges.

6. The sleeve of claim 5, wherein said strip is provided with a zipper or a Velcro fastener along the readily openable edge.

7. The sleeve of claim 1, wherein said strip has attached thereto a rigid material for maintaining the S-shape along its length.

8. The sleeve of claim 7, wherein said rigid material is filled with a whale bone.

9. The sleeve of claim 1, further including:

a guide along a lower part of one long edge of the strip, a slide attached to and movable along said guide, and an adjustable length clamp and a clip for connecting said slide to the abdomen portion of the safety belt.

10. The sleeve of claim 1, further including hitches along a lower part of one long edge of the sleeve, a pull for connecting to one of said hitches, and an adjustable length clamp and a clip for connecting said pull to the abdomen portion of the safety belt.

* * * * *